(12) United States Patent
Tang et al.

(10) Patent No.: US 12,010,520 B2
(45) Date of Patent: Jun. 11, 2024

(54) METHOD FOR ACCESSING MOBILE CORE NETWORK BY USING FIXED ACCESS DEVICE

(71) Applicant: HUAWEI TECHNOLOGIES CO., LTD., Guangdong (CN)

(72) Inventors: Jiecheng Tang, Shenzhen (CN); Bin Huang, Dongguan (CN); Cheng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 17/556,553

(22) Filed: Dec. 20, 2021

(65) Prior Publication Data

US 2022/0116788 A1    Apr. 14, 2022

Related U.S. Application Data

(63) Continuation of application No. PCT/CN2020/093577, filed on May 30, 2020.

(30) Foreign Application Priority Data

Jun. 24, 2019 (CN) .......................... 201910550675.6

(51) Int. Cl.
*H04W 4/12* (2009.01)
*H04W 12/06* (2021.01)
(Continued)

(52) U.S. Cl.
CPC .......... *H04W 12/63* (2021.01); *H04W 12/06* (2013.01); *H04W 60/00* (2013.01)

(58) Field of Classification Search
CPC ...... H04W 12/63; H04W 12/06; H04W 60/00
See application file for complete search history.

(56) References Cited

U.S. PATENT DOCUMENTS

2009/0016713 A1    1/2009 Liu et al.
2012/0238247 A1*   9/2012 Wen ...................... H04W 76/12
                                                       455/411
(Continued)

FOREIGN PATENT DOCUMENTS

CN    101674580 A    3/2010
CN    101707773 A    5/2010
(Continued)

OTHER PUBLICATIONS

Broadband Forum, "Revision 3; contrib-20838; SD-420; SD-420 R3 5G Fixed Mobile Convergence Study; Version 5," Broadband Forum Study Document, Nov. 2018, 157 pages.
(Continued)

*Primary Examiner* — Moustapha Diaby
(74) *Attorney, Agent, or Firm* — Fish & Richardson P.C.

(57) ABSTRACT

Embodiments of this application provide example methods for accessing a core network by using a fixed access device. One example method includes: receiving, a network registration request sent by customer-premises equipment; sending a network registration request message for the CPE to a mobile core network based on the network registration request; receiving an authentication request message; performing physical location authentication for the CPE based on a physical location identifier; in response to determining that the physical location authentication succeeds, sending an authentication response to the mobile core network; receiving a registration success message sent by the mobile core network; notifying, based on the registration success message, the CPE that network registration succeeds; and sending a service parameter to the CPE.

21 Claims, 6 Drawing Sheets

(51) Int. Cl.
*H04W 12/63* (2021.01)
*H04W 60/00* (2009.01)
*H04W 88/02* (2009.01)

(56) References Cited

U.S. PATENT DOCUMENTS

| | | | |
|---|---|---|---|
| 2015/0200849 A1* | 7/2015 | Wen | H04L 45/586 |
| | | | 370/328 |
| 2016/0248511 A1 | 8/2016 | Wang et al. | |
| 2020/0163012 A1* | 5/2020 | Zhu | H04W 12/08 |
| 2022/0116901 A1* | 4/2022 | Nilsson | H04W 8/26 |

FOREIGN PATENT DOCUMENTS

| | | |
|---|---|---|
| CN | 102740401 A | 10/2012 |
| CN | 106130840 A | 11/2016 |
| CN | 109391940 A | 2/2019 |
| WO | 2019024866 A1 | 2/2019 |

OTHER PUBLICATIONS

Extended European Search Report issued in European Application No. 20830721.5 dated Jun. 17, 2022, 108 pages.
3GPP TR 23.716 V16.0.0 (Dec. 2018), 3rd Generation Partnership Project; Technical Specification Group Services and System Aspects; Study on the Wireless and Wireline Convergencefor the 5G system architecture(Release 16), total 184 pages.
Broadband Forum, "SD-407, 5G Fixed Mobile Convergence Study, Revision: 27," Draft, Contrib-20777.v27, Jun. 2018, 174 pages.
Office Action issued in Chinese Application No. 201910550675.6 dated Sep. 2, 2021, 16 pages (with English translation).
PCT International Search Report and Written Opinion issued in International Application No. PCT/CN2020/093577 dated Aug. 21, 2020, 19 pages (with English translation).

* cited by examiner

METHOD FOR ACCESSING MOBILE CORE NETWORK BY USING FIXED ACCESS DEVICE

CROSS-REFERENCE TO RELATED APPLICATIONS

This application is a continuation of International Application No. PCT/CN2020/093577, filed on May 30, 2020, which claims priority to Chinese Patent Application No. 201910550675.6, filed on Jun. 24, 2019. The disclosures of the aforementioned applications are hereby incorporated by reference in their entireties.

TECHNICAL FIELD

This application relates to the field of communications technologies, and in particular, to a method for accessing a mobile core network by using a fixed access device.

BACKGROUND

Conventional wireless access is mainly as follows: A wireless terminal accesses a mobile core network through a radio air interface, and the mobile core network provides a voice call service and a mobile broadband (MBB) service. However, conventional fixed access is mainly as follows: A telephone, an optical network terminal (ONT), a DSL modem, a router, a network switch, a residential gateway (RG), a set-top box, a fixed-mobile convergence product, a home network adapter, an Internet access gateway, and another device access a fixed core network through a medium such as an optical fiber or a copper line, and the fixed core network provides a broadband service to the device.

However, with development of wireless technologies, for example, with scale-deployment of 4G, a wireless access capacity is greatly improved. With arrival of future 5G, the wireless access capacity is further improved. In another aspect, conventional fixed access faces a problem that a deployment period is long and costs are high due to difficulty in deploying a fiber to the home. Therefore, in a conventional technology, a case in which a broadband service is provided by using an established base station through wireless access occurs, that is, wireless to the x (wireless to the x, WTTx). Because the base station has an inventory advantage, when an optical fiber is not deployed in place, an operator can quickly develop a broadband user by using the WTTx solution. However, with popularization of 4K/8K and the like, a fixedly accessed optical fiber is the best solution for a high-bandwidth and high-value user, that is, fiber to the x (FTTx).

Currently, when implementing migration from a WTTx user to an FTTx user, the operator needs to newly deploy an entire set of end-to-end networks adapting to fixed access, including a fixed core network, and consequently inevitably faces problems of a long deployment period and high costs, and has high maintenance costs.

SUMMARY

For a technical problem existing in a conventional technology, embodiments of this application provide a method for accessing a mobile core network by using a fixed access device, which may be applied to a scenario in which an operator migrates a WTTx user to an FTTx user, and may also be applied to a scenario in which a conventional fixed network user is migrated to a mobile core network. According to the method for accessing a mobile core network by using a fixed access device provided in the embodiments of this application, a deployed mobile core network can be used to provide a broadband service to an FTTx user (including a migrated WTTx user and a conventional fixed network user). In addition, an operator does not need to establish a new fixed core network, so that costs can be reduced and a service can be quickly migrated. In addition, in the technical solution in which the mobile core network provides a service to both fixed access and wireless access, a network can be simplified and can be easy to be maintained subsequently.

According to a first aspect, an embodiment of this application provides a method for accessing a mobile core network by using a fixed access device, including: receiving, by a fixed access device, a network registration request sent by customer-premises equipment (customer-premises equipment, CPE), where the CPE completes registration with the fixed access device on a physical layer and a line layer; sending, by the fixed access device, a network registration request message for the CPE to a mobile core network based on the network registration request, where the network registration request message includes a user identifier of the CPE; receiving, by the fixed access device, an authentication request message sent by the mobile core network for the CPE, where the authentication request message includes an authentication parameter and a physical location identifier of the CPE that are obtained by the mobile core network from a user data server based on the user identifier of the CPE; performing, by the fixed access device, physical location authentication for the CPE based on the physical location identifier; if the physical location authentication succeeds, sending, by the fixed access device, an authentication response to the mobile core network, where the authentication response is obtained through calculation based on the authentication parameter and key information of the CPE; receiving, by the fixed access device, a registration success message sent by the mobile core network, where the registration success message includes a service parameter that is allocated to the CPE by the mobile core network based on the authentication response after authentication for the CPE succeeds; notifying, by the fixed access device based on the registration success message, the CPE that network registration succeeds, and sending the service parameter to the CPE.

In a possible implementation of the first aspect, the receiving, by a fixed access device, a network registration request sent by customer-premises equipment CPE includes: receiving, by the fixed access device, a first user-side signaling packet sent by the CPE, where the first user-side signaling packet is generated by encapsulating, by the CPE, the network registration request message into a link layer protocol of a fixed access network, where the network registration request message complies with a NAS (non-access stratum) signaling protocol of 3GPP.

In a possible implementation of the first aspect, the sending, by the fixed access device, a network registration request message for the CPE to a mobile core network based on the network registration request includes: parsing, by the fixed access device, the first user-side signaling packet to obtain the network registration request message, and encapsulating the network registration request message into a signaling protocol required by the mobile core network, to generate a first network-side signaling packet; and sending, by the fixed access device, the first network-side signaling packet to the mobile core network.

In a possible implementation of the first aspect, before the sending, by the fixed access device, an authentication response to the mobile core network, the method further includes: parsing, by the fixed access device, the authentication request message to obtain the authentication parameter, and encapsulating the authentication parameter into the link layer protocol of the fixed access network to generate a second user-side signaling packet; sending, by the fixed access device, the second user-side signaling packet to the CPE; receiving, by the fixed access device, a fourth user-side signaling packet sent by the CPE, where the fourth user-side signaling packet is generated by encapsulating, by the CPE into the link layer protocol of the fixed access network, the authentication response obtained through calculation based on the authentication parameter in the second user-side signaling packet and the key information of the CPE; and parsing, by the fixed access device, the fourth user-side signaling packet to obtain the authentication response.

In a possible implementation of the first aspect, the sending, by the fixed access device, an authentication response to the mobile core network includes: encapsulating, by the fixed access device, the authentication response into a signaling protocol required by the mobile core network, to generate a second network-side signaling packet; and sending, by the fixed access device, the second network-side signaling packet to the mobile core network.

In a possible implementation of the first aspect, the notifying, by the fixed access device based on the registration success message, the CPE that network registration succeeds, and sending the service parameter to the CPE includes: after parsing the registration success message, encapsulating, by the fixed access device, the parsed registration success message into the link layer protocol of the fixed access network to generate a fifth user-side signaling packet; and sending, by the fixed access device, the fifth user-side signaling packet to the CPE.

In a possible implementation of the first aspect, the network registration request is an IP address application request, and the receiving, by a fixed access device, a network registration request sent by customer-premises equipment CPE includes: receiving, by the fixed access device, the IP address application request sent by the CPE by using a dynamic host configuration protocol (Dynamic Host Configuration Protocol, DHCP) DHCP.

In a possible implementation of the first aspect, the sending, by the fixed access device, a network registration request message for the CPE to a mobile core network based on the network registration request includes: in response to the IP address application request, obtaining, by the fixed access device based on a hardware identifier of the CPE, the user identifier belonging to the CPE; generating, by the fixed access device, the network registration request message that carries the user identifier of the CPE, where the network registration request message complies with a NAS signaling protocol of 3GPP; encapsulating, by the fixed access device, the network registration request message into a signaling protocol required by the mobile core network, to generate a third network-side signaling packet; and sending, by the fixed access device, the third network-side signaling packet to the mobile core network.

In a possible implementation of the first aspect, before the sending, by the fixed access device, an authentication response to the mobile core network, the method further includes: parsing, by the fixed access device, the authentication request message to obtain the authentication parameter, and calculating the authentication response based on the authentication parameter and the key information of the CPE.

The sending, by the fixed access device, an authentication response to the mobile core network includes: encapsulating, by the fixed access device, the authentication response into a signaling protocol required by the mobile core network, to generate a fourth network-side signaling packet; and sending, by the fixed access device, the fourth network-side signaling packet to the mobile core network.

In a possible implementation of the first aspect, the notifying, by the fixed access device based on the registration success message, the CPE that network registration succeeds, and sending the service parameter to the CPE includes: sending, by the fixed access device, a DHCP ACK to the CPE, where the DHCP ACK includes the service parameter allocated to the CPE by the mobile core network.

In a possible implementation of the first aspect, the method further includes: if the physical location authentication fails, generating, by the fixed access device, a registration failure message based on the NAS signaling protocol of the 3GPP; encapsulating, by the fixed access device, the registration failure message into the link layer protocol of the fixed access network to generate a third user-side signaling packet; and sending, by the fixed access device, the third user-side signaling packet to the CPE to notify the CPE that network registration fails.

In a possible implementation of the first aspect, the method further includes: if the physical location authentication fails, sending, by the fixed access device, a DHCP NAK or DECLINE to the CPE to notify the CPE that network registration fails.

In a possible implementation of the first aspect, the performing, by the fixed access device, physical location authentication for the CPE based on the physical location identifier includes: comparing, by the fixed access device, the physical location identifier in the authentication request message with an actual physical location identifier of the CPE, where that the physical location authentication succeeds means that the physical location identifier in the authentication request message matches the actual physical location identifier of the CPE, and that the physical location authentication fails means that the physical location identifier in the authentication request message does not match the actual physical location identifier of the CPE.

According to a second aspect, an embodiment of this application provides a method for accessing a mobile core network by using a fixed access device, including: generating, by customer-premises equipment CPE, a network registration request message, where the network registration request message is used to apply for accessing a mobile core network by the CPE, and the network registration request message includes a user identifier of the CPE; encapsulating, by the CPE, the network registration request message into a link layer protocol of a fixed access network to generate a first user-side signaling packet; sending, by the CPE, the first user-side signaling packet to a fixed access device, so that the fixed access device forwards the network registration request message to the mobile core network, where the CPE completes registration with the fixed access device on a physical layer and a line layer; receiving, by the CPE, a second user-side signaling packet sent by the fixed access device, where the second user-side signaling packet is generated by encapsulating, by the fixed access device, an authentication parameter into the link layer protocol of the fixed access network, and the authentication parameter is an authentication parameter obtained by the mobile core network from a user data server based on the user identifier of the CPE; obtaining, through calculation by the CPE, an authentication response based on the authentication parameter in the second user-side signaling packet and key information of the CPE; encapsulating, by the CPE, the authentication response into the link layer protocol of the fixed access network to generate a fourth user-side signaling packet; sending, by the CPE, the fourth user-side signaling packet to the fixed access device, so that the fixed access device forwards the authentication response to the mobile core network; and receiving, by the CPE, a fifth user-side signaling packet sent by the fixed access device, where the fifth user-side signaling packet includes a service parameter that is allocated to the CPE by the mobile core network based on the authentication response after authentication for the CPE succeeds.

According to a third aspect, an embodiment of this application provides a method for accessing a mobile core network by using a fixed access device, including: receiving, by a mobile core network, a network registration request message sent by a fixed access device, where the network registration request message is used to apply for accessing the mobile core network by customer-premises equipment CPE, the CPE completes registration with the fixed access device on a physical layer and a line layer, and the network registration request message includes a user identifier of the CPE; obtaining, by the mobile core network, an authentication parameter from a user data server based on the user identifier of the CPE; generating, by the mobile core network, an authentication request message that carries the authentication parameter and a physical location identifier of the CPE; sending, by the mobile core network, the authentication request message to the fixed access device, so that the fixed access device forwards the authentication parameter in the authentication request message to the CPE, where the physical location identifier is used by the fixed access device to perform physical location authentication for the CPE; receiving, by the mobile core network, an authentication response sent by the fixed access device, where the authentication response is obtained through calculation based on the authentication parameter and key information of the CPE; performing, by the mobile core network, authentication for the CPE based on the authentication response; after authentication succeeds, allocating, by the mobile core network, a service resource to the CPE, and generating a registration success message that carries the service resource; and sending, by the mobile core network, the registration success message to the fixed access device, so that the fixed access device forwards the registration success message to the CPE.

According to a fourth aspect, an embodiment of this application provides a fixed access device, so that customer-premises equipment CPE can access a mobile core network. The fixed access device includes a receiving module, a sending module, and a location authentication module. The receiving module is configured to receive a network registration request sent by the customer-premises equipment CPE, where the CPE completes registration with the fixed access device on a physical layer and a line layer. The sending module is configured to send a network registration request message for the CPE to the mobile core network, where the network registration request message includes a user identifier of the CPE. The receiving module is further configured to receive an authentication request message sent by the mobile core network for the CPE, where the authentication request message includes an authentication parameter and a physical location identifier of the CPE that are obtained by the mobile core network from a user data server based on the user identifier of the CPE. The location authentication module is configured to perform physical location authentication for the CPE based on the physical location identifier in the authentication request message received by the receiving module. If the physical location authentication succeeds, the sending module is further configured to send an authentication response to the mobile core network, where the authentication response is obtained through calculation based on the authentication parameter and key information of the CPE. The receiving module is further configured to receive a registration success message sent by the mobile core network, where the registration success message includes a service parameter that is allocated to the CPE by the mobile core network based on the authentication response after authentication for the CPE succeeds. The sending module is further configured to: notify the CPE that network registration succeeds, and send the service parameter to the CPE.

In a possible implementation of the fourth aspect, the receiving module is specifically configured to receive a first user-side signaling packet sent by the CPE, where the first user-side signaling packet is generated by encapsulating, by the CPE, the network registration request message into a link layer protocol of a fixed access network, where the network registration request message complies with a NAS signaling protocol of 3GPP.

In a possible implementation of the fourth aspect, the fixed access device further includes a packet parsing module. The packet parsing module is configured to parse the first user-side signaling packet received by the receiving module, to obtain the network registration request message. The sending module is specifically configured to: encapsulate the network registration request message obtained by the packet parsing module through parsing into a signaling protocol required by the mobile core network, to generate a first network-side signaling packet; and send the first network-side signaling packet to the mobile core network.

In a possible implementation of the fourth aspect, the packet parsing module is further configured to parse the authentication request message received by the receiving module, to obtain the authentication parameter. The sending module is specifically configured to encapsulate the authentication parameter obtained by the packet parsing module through parsing into the link layer protocol of the fixed access network, to generate a second user-side signaling packet; and send the second user-side signaling packet to the CPE. The receiving module is further configured to receive a fourth user-side signaling packet sent by the CPE, where the fourth user-side signaling packet is generated by encapsulating, by the CPE into the link layer protocol of the fixed access network, the authentication response obtained through calculation based on the authentication parameter in the second user-side signaling packet and the key information of the CPE. The packet parsing module is further configured to parse the fourth user-side signaling packet received by the receiving module, to obtain the authentication response.

In a possible implementation of the fourth aspect, the sending module is specifically configured to: encapsulate the authentication response obtained by the packet parsing module through parsing into a signaling protocol required by the mobile core network, to generate a second network-side signaling packet; and send the second network-side signaling packet to the mobile core network.

In a possible implementation of the fourth aspect, the packet parsing module parses the registration success message received by the receiving module. The sending module is specifically configured to: encapsulate the registration success message parsed by the packet parsing module into the link layer protocol of the fixed access network, to generate a fifth user-side signaling packet; and send the fifth user-side signaling packet to the CPE.

In a possible implementation of the fourth aspect, the receiving module is specifically configured to receive an IP address application request sent by the CPE by using a dynamic host configuration protocol DHCP.

In a possible implementation of the fourth aspect, the fixed access device further includes a proxy module. The proxy module is configured to: obtain, based on the IP address application request received by the receiving module and a hardware identifier of the CPE, the user identifier belonging to the CPE; and generate the network registration request message that carries the user identifier of the CPE, where the network registration request message complies with a NAS signaling protocol of 3GPP. The sending module is specifically configured to: encapsulate, into a signaling protocol required by the mobile core network, the network registration request message generated by the proxy module to generate a third network-side signaling packet; and send the third network-side signaling packet to the mobile core network.

In a possible implementation of the fourth aspect, the fixed access device further includes a packet parsing module.

The packet parsing module is configured to parse the authentication request message received by the receiving module, to obtain the authentication parameter. The proxy module is further configured to calculate the authentication response based on the authentication parameter obtained by the packet parsing module through parsing and the key information of the CPE. The sending module is specifically configured to: encapsulate the authentication response obtained by the proxy module into a signaling protocol required by the mobile core network, to generate a fourth network-side signaling packet; and send the fourth network-side signaling packet to the mobile core network.

In a possible implementation of the fourth aspect, the sending module is specifically configured to send a DHCP ACK to the CPE to notify the CPE that network registration succeeds, where the DHCP ACK includes the service parameter allocated to the CPE by the mobile core network.

In a possible implementation of the fourth aspect, if the physical location authentication fails, the sending module is further configured to: generate a registration failure message based on the NAS signaling protocol of the 3GPP; encapsulate the registration failure message into the link layer protocol of the fixed access network to generate a third user-side signaling packet; and send the third user-side signaling packet to the CPE to notify the CPE that network registration fails.

In a possible implementation of the fourth aspect, if the physical location authentication fails, the sending module is further configured to send a DHCP NAK or DECLINE to the CPE to notify the CPE that network registration fails.

In a possible implementation of the fourth aspect, the location authentication module is specifically configured to compare the physical location identifier in the authentication request message received by the receiving module with an actual physical location identifier of the CPE, where that the physical location authentication succeeds means that the physical location identifier in the authentication request message matches the actual physical location identifier of the CPE, and that the physical location authentication fails means that the physical location identifier in the authentication request message does not match the actual physical location identifier of the CPE.

According to a fifth aspect, an embodiment of this application provides customer-premises equipment CPE. The CPE accesses a mobile core network by using a fixed access device, the CPE completes registration with the fixed access device on a physical layer and a line layer, and the CPE includes a receiving module, a sending module, and an authentication module. The sending module is configured to: encapsulate a network registration request message into a link layer protocol of a fixed access network to generate a first user-side signaling packet, and send the first user-side signaling packet to the fixed access device, so that the fixed access device forwards the network registration request message to the mobile core network, where the network registration request message includes a user identifier of the CPE. The receiving module is configured to receive a second user-side signaling packet sent by the fixed access device, where the second user-side signaling packet is generated by encapsulating, by the fixed access device, an authentication parameter into the link layer protocol of the fixed access network, and the authentication parameter is an authentication parameter obtained by the mobile core network from a user data server based on the user identifier of the CPE. The authentication module is configured to obtain an authentication response through calculation based on key information of the CPE and the authentication parameter in the second user-side signaling packet received by the receiving module. The sending module is further configured to: encapsulate the authentication response obtained by the authentication module into the link layer protocol of the fixed access network to generate a fourth user-side signaling packet, and send the fourth user-side signaling packet to the fixed access device, so that the fixed access device forwards the authentication response to the mobile core network. The receiving module is further configured to receive a fifth user-side signaling packet sent by the fixed access device, where the fifth user-side signaling packet includes a service parameter that is allocated to the CPE by the mobile core network based on the authentication response after authentication for the CPE succeeds.

According to a sixth aspect, an embodiment of this application provides a mobile core network, and the mobile core network includes a receiving module, a sending module, an authentication and certification module, and a service resource configuration module. The receiving module is configured to receive a network registration request message sent by a fixed access device, where the network registration request message is used to apply for accessing the mobile core network by customer-premises equipment CPE, the CPE completes registration with the fixed access device on a physical layer and a line layer, and the network registration request message includes a user identifier of the CPE. The authentication and certification module is configured to: obtain an authentication parameter from a user data server based on the user identifier of the CPE, and generate an authentication request message that carries the authentication parameter and a physical location identifier of the CPE. The sending module is configured to send the authentication request message to the fixed access device, so that the fixed access device forwards the authentication parameter in the authentication request message to the CPE, where the physical location identifier is used by the fixed access device to perform physical location authentication for the CPE. The receiving module is further configured to receive an authentication response sent by the fixed access device, where the authentication response is obtained through calculation based on the authentication parameter and key information of the CPE. The authentication and certification module is further configured to perform authentication for the CPE based on the authentication response. After authentication performed by the authentication and certification module succeeds, the service resource configuration module is configured to allocate a service resource to the CPE; and the sending module is further configured to: generate a registration success message that carries the service resource, and send the registration success message to the fixed access device, so that the fixed access device forwards the registration success message to the CPE.

According to a seventh aspect, an embodiment of this application provides a communications system, and the communications system includes a fixed access device 220, a mobile core network 230, and a base station 250. The fixed access device 220 and the mobile core network 230 communicate with each other through a communications cable, and the base station 250 and the mobile core network 230 communicate with each other by using a wireless communications protocol. The fixed access device 220 encapsulates a message into a signaling protocol required by the mobile core network 230, to generate a network-side signaling packet, and sends the network-side signaling packet to the mobile core network 230.

In a possible implementation of the seventh aspect, the fixed access device 220 is connected to customer-premises equipment CPE 210 through a communications cable. The fixed access device 220 parses a link layer protocol of a fixed access network to obtain a message sent from the CPE 210; encapsulates the message into a signaling protocol required by the mobile core network 230, to generate a network-side signaling packet; and sends the network-side signaling packet to the mobile core network 230.

According to the method provided in the embodiments of this application, a device (CPE) of a fixed network user can access a mobile core network by using a fixed access device without adding a fixed core network or a specific gateway.

DESCRIPTION OF EMBODIMENTS

Figure 1:
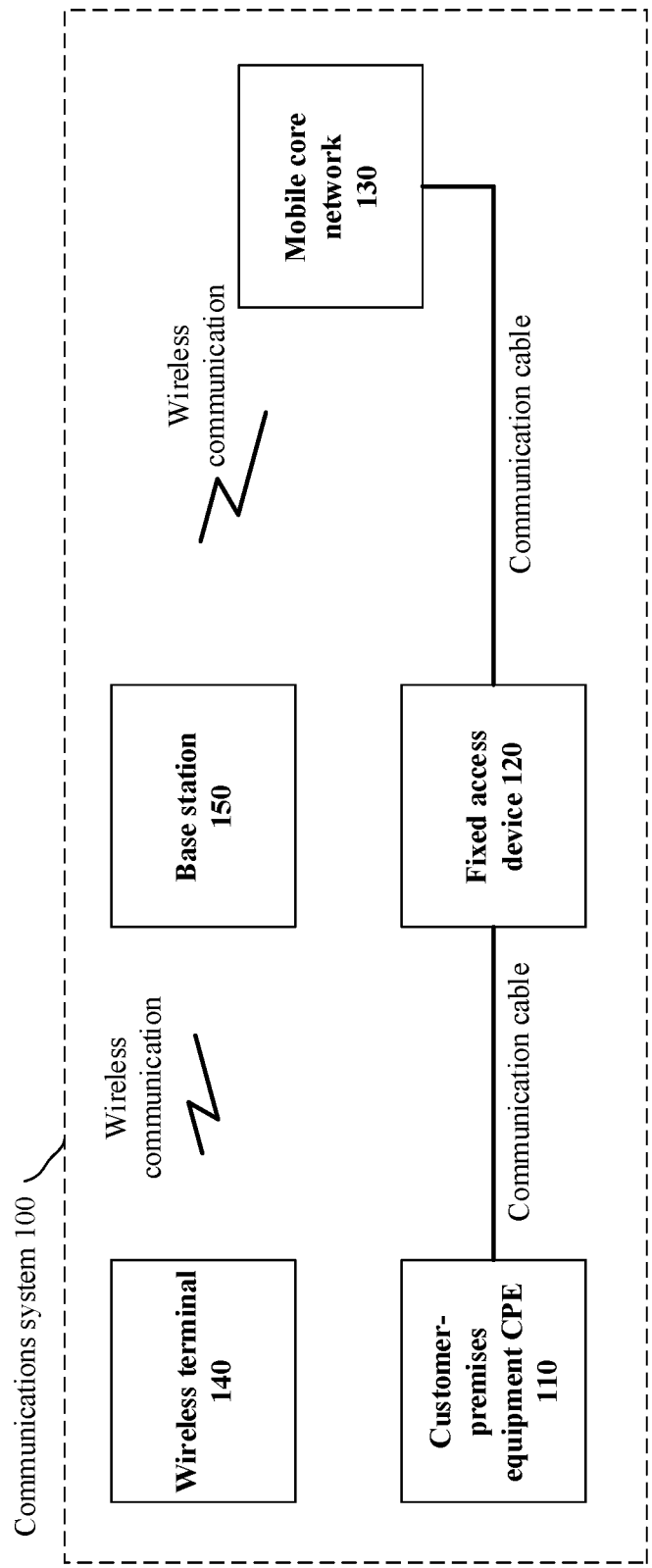
FIG. 1 is a schematic diagram of an architecture of a communications system according to an embodiment of this application.

To make the objectives, technical solutions, and advantages of this application clearer, the following further describes the technical solutions of this application in detail with reference to the accompanying drawings. It is clearly that the described embodiments are a part rather than all of the embodiments of the present invention. All other embodiments obtained by a person of ordinary skill in the art based on the embodiments of the present invention without creative efforts shall fall within the protection scope of the present invention.

The following are nouns and corresponding English expressions or English abbreviations that may be used in the embodiments of this application.

| English acronyms and abbreviations | Full English description |
| --- | --- |
| FTTx | fiber to the x |
| WTTx | wireless to the x |
| CPE | customer-premises equipment |
| EAPOL | Extensible Authentication Protocol over LAN |
| OLT | optical line terminal |
| ONT | optical network terminal |
| DSLAM | digital subscriber line access multiplexer |
| USIM | UMTS subscriber identity module |
| IMSI | international mobile subscriber identity |
| UMTS | Universal Mobile Telecommunications System |
| NAS | non-access stratum |
| 3GPP | 3rd Generation Partnership Project |

An embodiment of this application provides a communications system 100. Referring to a system architecture shown in FIG. 1, the communications system 100 includes customer-premises equipment (Customer-premises Equipment, CPE) 110, a fixed access device 120, a mobile core network 130, a wireless terminal 140, and a base station 150. The CPE 110 and the fixed access device 120 are connected through a communications cable such as an optical fiber or a copper line to transmit data to each other. The wireless terminal 140 and the base station 150 are connected through wireless communication (a wireless communications protocol is not limited, and 2G, 3G, 4G, or 5G may be used) to transmit data to each other. The fixed access device 120 and the mobile core network 130 are connected through a communications cable to transmit data to each other. The base station 150 and the mobile core network 130 are connected through wireless communication to transmit data to each other. Optionally, in an FTTx scenario, the CPE 110 and the fixed access device 120 are connected through an optical fiber cable.

The CPE 110 is any terminal and related device at a location of a user, and is connected, at a demarcation point, to a network provided by an operator. The demarcation point is a term in the communications field, and is a point established in a building or complex to separate a customer-premises equipment from a device located in a distribution infrastructure or central office of the operator. In this embodiment of this application, both the CPE 110 and the wireless terminal 140 need to access the mobile core network 130 to obtain a corresponding service. A difference between the CPE 110 and the wireless terminal 140 lies in the following: The CPE 110 is connected to the mobile core network by using the fixed access device 120. This may be considered as a fixed access manner, and is apparently different from a conventional fixed access manner in that the CPE 110 accesses the mobile core network. However, access of the wireless terminal 140 is a wireless access manner in a conventional technology. The CPE 110 may be one of the following devices: a phone, an ONT, a DSL modem, a router, a network switch, a residential gateway RG, a set-top box, a fixed-mobile convergence product, a home network adapter, or an Internet access gateway. The CPE 110 can enable a user to obtain a corresponding service by using a nearby local area network (LAN).

The fixed access device 120 may provide different fixed-line access means, such as access through an optical fiber and access through a copper line, to aggregate traffic of a fixed terminal and access an upper-layer network. In this embodiment of this application, the fixed access device 120 is configured to aggregate traffic of the CPE 110 and access the mobile core network 130. The fixed access device 120 may be one of the following devices: an optical access terminal (OLT), a copper line access device (digital subscriber line access multiplexer, DSLAM), and a coaxial access device (CMTS); or may be a device that supports another fixed access means.

A main function of the mobile core network is to provide a mobile terminal with the following services: performing user connection and access, authentication and certification, and charging; managing a user and bearing a service; allocating a corresponding network resource to the user; and providing the user with a service of accessing services such as voice and data. In this embodiment of this application, the mobile core network 130 is configured to provide the CPE 110 and the wireless terminal 140 with the following services: performing user connection and access, authentication and certification, and charging; managing a user and bearing a service; allocating a corresponding network resource to the user; and providing the user with services such as voice, data, and a broadband. In other words, the mobile core network 130 can provide a corresponding service to both fixed access (for example, the CPE 110 accesses the mobile core network 130 by using the fixed access device 120) and wireless access (for example, the wireless terminal 140 accesses the mobile core network 130 by using the base station 150). The mobile core network may be understood as follows: A mobile network is divided into three parts: a base station subsystem, a network subsystem, and a system support part (for example, security management). The mobile core network part is located in the network subsystem. A main function of the core network is to connect, to different networks, a call request or data request from an A interface.

Further, the fixed access device 120 encapsulates, into a signaling protocol (such as S1 or N2) required by the mobile core network 130, a message/packet to be sent to the mobile core network 130, to generate a network-side signaling packet; and sends the network-side signaling packet to the mobile core network 130. In some embodiments, optionally, the CPE 110 encapsulates, into a link layer protocol of a fixed access network, a message/packet to be sent to the fixed access device 120, to generate a user-side signaling packet; and sends the user-side signaling packet to the fixed access device 120. Optionally, the fixed access device 120 encapsulates, into the link layer protocol of the fixed access network, a message/packet to be sent to the CPE 110, to generate a user-side signaling packet; and sends the user-side signaling packet to the CPE 110. It should be noted that the fixed access network is a concept that can be understood by a person skilled in the art, and is a set of networks for accessing an access interface of the fixed access device by the customer-premises equipment.

In a scenario of migration from WTTx to FTTx, the base station 150 and the mobile core network 130 belong to a deployed mobile core network, and the wireless terminal 140 accesses the mobile core network 130 by using the base station 150. The system architecture shown in FIG. 1 is implemented based on a deployed mobile network. The mobile core network 130 provides a service to the wireless terminal 140, and the service still runs normally based on a deployed situation.

In the system architecture shown in FIG. 1, a mobile core network can provide a corresponding service to both fixed access and wireless access. In particular, in a scenario in which an operator migrates a WTTx user to an FTTx user, a fixed core network does not need to be newly deployed, so that costs can be reduced and a service can be quickly migrated, and network simplification and simple subsequent maintenance of a core network can be implemented.

Figure 2:
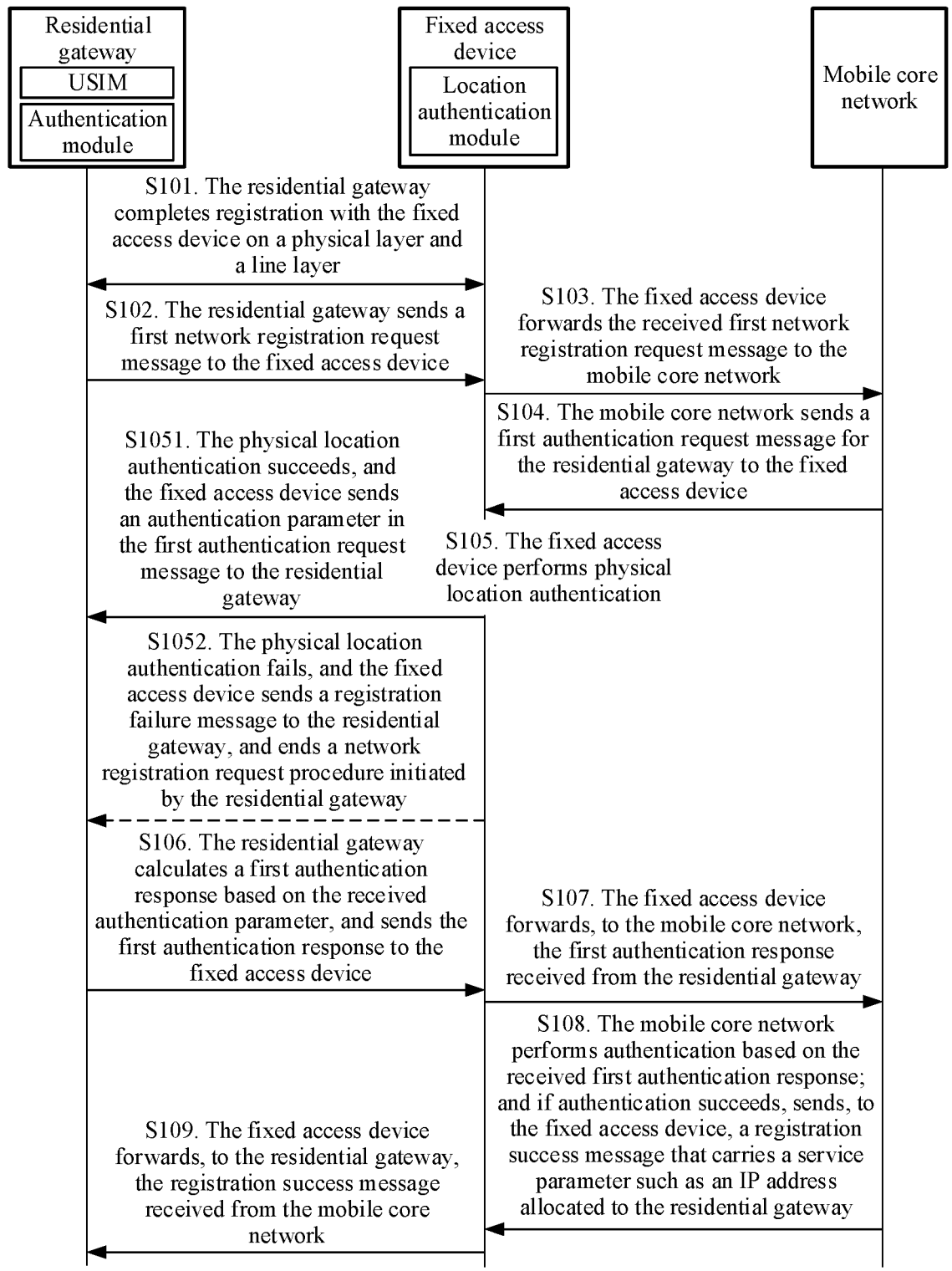
FIG. 2 is a schematic flowchart of a method for accessing a mobile core network by using a fixed access device according to an embodiment of this application.

An embodiment of this application provides a method for accessing a mobile core network by using a fixed access device. As shown in FIG. 2, the method can implement that the CPE 110 in FIG. 1 accesses the deployed mobile core network 130 by using the fixed access device 120. In the embodiment shown in FIG. 2, the CPE 110 is equipped with a built-in UMTS subscriber identity module (UMTS subscriber identity module, USIM), and has an authentication module with an authentication function. Further, the authentication function is a NAS access authentication procedure supporting 3GPP. The fixed access device 120 has a location authentication module with a physical location authentication function. In the embodiment shown in FIG. 2, that the CPE 110 is a residential gateway RG (referring to FIG. 2) is used as an example. The method includes the following steps.

S101. The residential gateway completes registration with the fixed access device on a physical layer and a line layer. Further, a specific step of a registration procedure is the same as that of an existing registration procedure of a fixed access network. After completing registration, the residential gateway and the fixed access device can communicate with each other, and the fixed access device obtains a hardware identifier (for example, a MAC address) of the residential gateway. If an ONT is used to replace the residential gateway, a hardware identifier of the ONT may be an ONT SNID. It should be noted that the residential gateway is not connected to the mobile core network in this case, and therefore cannot obtain a service (such as a broadband service) of the mobile core network.

S102. The residential gateway sends a first network registration request message to the fixed access device. Specifically, the residential gateway reads a user identifier in the built-in USIM of the residential gateway, that is, an international mobile subscriber identity (international mobile subscriber identity, IMSI), and generates the first network registration request message that carries the user identifier. Further, a specific format of the first network registration request message complies with a NAS signaling protocol (for example, an attach request) of 3GPP. In this case, the residential gateway does not obtain an IP address. Therefore, the residential gateway encapsulates the first network registration request message into a link layer protocol of the fixed access network (for example, an EAPOL protocol is used to carry a network registration request) to generate a first user-side signaling packet, and sends the first user-side signaling packet to the fixed access device.

S103. The fixed access device forwards, to the mobile core network, the first network registration request message received from the residential gateway. Specifically, the fixed access device receives the first user-side signaling packet sent by the residential gateway, and obtains, through parsing, the first network registration request message of the residential gateway in the first user-side signaling packet. Then the fixed access device encapsulates the first network registration request message obtained through parsing into a signaling protocol (such as S1 or N2) required by the mobile core network, to generate a first network-side signaling packet, and sends the first network-side signaling packet to the mobile core network. In addition, the fixed access device further records a correspondence between the hardware identifier (for example, a MAC address) and the user identifier (IMSI) that are of the residential gateway. In specific implementation, before the fixed access device forwards the network registration request message, complying with a signaling protocol (for example, S1 or N2) required by the mobile core network, the fixed access device establishes a network-side signaling channel to the mobile core network.

S104. The mobile core network sends a first authentication request message for the residential gateway to the fixed access device. Specifically, the mobile core network receives the first network-side signaling packet sent by the fixed access device, and obtains the first network registration request message of the residential gateway from the first network-side signaling packet. Then the mobile core network obtains an authentication parameter from a user data server based on the user identifier (IMSI) in the first network registration request message, and generates the first authentication request message that carries the authentication parameter. The first authentication request message further carries a physical location identifier of the residential gateway that initiates a first network registration request. Then the mobile core network sends the first authentication request message to the fixed access device. In specific implementation, for a fixed network user (that is, the residential gateway), when the fixed network user is registered, the physical location identifier of CPE (that is, the residential gateway) of the fixed network user is configured in the user data server, to be used for physical location authentication. The authentication request message carries the physical location identifier. Specifically, a TLV (Type-length-value) field may be newly added to the authentication request message to carry the physical location identifier. It should be noted that a message/packet sent by the mobile core network to the fixed access device complies with a signaling protocol (such as S1 or N2) required by the mobile core network.

S105. The fixed access device performs physical location authentication. Specifically, the fixed access device receives the first authentication request message sent by the mobile core network, and then the location authentication module compares the physical location identifier in the first authentication request message with an actual physical location identifier of the residential gateway.

S1051. If the physical location identifier in the first authentication request message matches the actual physical location identifier of the residential gateway, it indicates that the physical location authentication succeeds. In this case, the fixed access device removes the physical location identifier in the first authentication request message, and encapsulates, into the link layer protocol (such as an EAPOL protocol) of the fixed access network, the authentication parameter obtained by parsing the first authentication request message, to generate a second user-side signaling packet. Then the fixed access device sends the second user-side signaling packet to the residential gateway based on the correspondence between the user identifier (IMSI) and the hardware identifier of the residential gateway.

Optionally, in S1052, if the physical location identifier in the first authentication request message does not match the actual physical location identifier of the residential gateway, it indicates that the physical location authentication fails. In this case, the fixed access device generates a registration failure message based on a NAS signaling protocol of 3GPP. Then the fixed access device encapsulates the registration failure message into the link layer protocol of the fixed access network to generate a third user-side signaling packet, sends the third user-side signaling packet to the residential gateway based on the correspondence between the user identifier (IMSI) and the hardware identifier of the residential gateway, and ends a network registration procedure initiated by the residential gateway.

When the physical location authentication succeeds, the method further includes S106 in which the residential gateway calculates a first authentication response based on the received authentication parameter, and sends the first authentication response to the fixed access device. Specifically, the residential gateway obtains the first authentication response through calculation based on key information stored in the built-in USIM and the authentication parameter in the second user-side signaling packet received from the fixed access device. The residential gateway encapsulates the obtained first authentication response into the link layer protocol of the fixed access network to generate a fourth user-side signaling packet, and sends the fourth user-side signaling packet to the fixed access device.

S107. The fixed access device forwards, to the mobile core network, the first authentication response received from the residential gateway. Specifically, the fixed access device receives the fourth user-side signaling packet sent by the residential gateway. The fixed access device parses the received fourth user-side signaling packet to obtain the first authentication response, encapsulates the first authentication response obtained through parsing into a signaling protocol (such as S1 or N2) required by the mobile core network, to generate a second network-side signaling packet, and sends the second network-side signaling packet to the mobile core network.

S108. The mobile core network performs authentication based on the received first authentication response. Specifically, the mobile core network receives the second network-side signaling packet sent by the fixed access device. The mobile core network compares the first authentication response in the second network-side signaling packet with a result obtained by the mobile core network through calculation based on the locally stored key information related to the residential gateway and the authentication parameter in the first authentication request message. If the first authentication response is consistent with the result, it indicates that authentication succeeds, that is, network registration of the residential gateway succeeds, the mobile core network allocates a corresponding IP address and service resource to the residential gateway, generates a registration success message that carries a service parameter such as the allocated IP address, and sends the registration success message to the fixed access device. Alternatively, if the first authentication response is inconsistent with the result, it indicates that authentication fails, and the mobile core network generates a registration failure message, and forwards the registration failure message to the residential gateway by using the fixed access device.

S109. The fixed access device forwards, to the residential gateway, the registration success message received from the mobile core network. Specifically, the fixed access device receives and parses the registration success message sent by the mobile core network. After parsing the registration success message sent by the mobile core network, the fixed access device encapsulates the parsed registration success message into the link layer protocol of the fixed access network to generate a fifth user-side signaling packet, and sends the fifth user-side signaling packet to the residential gateway.

That network registration succeeds means that the residential gateway accesses the mobile core network and can use a service such as a broadband service provided by the mobile core network.

According to the method for accessing a mobile core network by using a fixed access device provided in the embodiment shown in FIG. 2, CPE (for example, a residential gateway) can access a mobile core network by using a fixed access device without deploying a dedicated gateway. The fixed access device is configured to implement a network-side encapsulation interface required for interconnection with the mobile core network, to encapsulate and forward a message between the CPE and the mobile core network, that is, message forwarding. In addition, according to the method for accessing a mobile core network by using a fixed access device provided in the embodiment shown in FIG. 2, the CPE accesses the mobile core network by using the fixed access device, and the CPE does not need to complete access to a fixed core network in advance and obtain an IP address by using the fixed network service. In the embodiment shown in FIG. 2, the CPE interacts with the fixed access device by using the link layer protocol of the fixed access network as a bearer channel, and the fixed access device forwards a message/packet to the mobile core network. In addition to performing USIM-based key authentication for the fixedly accessed CPE (refer to S108), physical location authentication (refer to steps S104 and S105) usually required for fixed access is implemented by using a procedure of the mobile core network.

A specific application scenario of the method for accessing a mobile core network by CPE (for example, a residential gateway) by using a fixed access device provided in the embodiment shown in FIG. 2 is a scenario of migration from WTTx to FTTx. In other words, the CPE in the embodiment shown in FIG. 2 is evolved from CPE of a WTTx user. To be specific, the CPE of the WTTx user is usually equipped with a built-in USIM or a built-in module with a function similar to the USIM. When the CPE uses the method for accessing a mobile core network by using a fixed access device provided in the embodiment shown in FIG. 2 to access the mobile core network, the WTTx user can be migrated to an FTTx user. For the WTTx user, the CPE does not need to be replaced, or the CPE only needs to be upgraded and modified, so that the CPE of the WTTx user has a fixed access function. Therefore, costs brought by replacement of the CPE are not added. For an operator, a dedicated mobile core network access gateway and a fixed core network do not need to be newly deployed, which greatly reduces costs of migration from a WTTx user to an FTTx user and can implement fast migration. In addition, the mobile core network provides a service to both fixed access (for example, the CPE 110) and wireless access (the wireless terminal 140), which can also simplify a network and reduce subsequent maintenance costs and complexity of the operator.

Referring to the description of the embodiment shown in FIG. 2, an embodiment provides another method for accessing a mobile core network by using a fixed access device, which can implement that the CPE 110 in FIG. 1 accesses the deployed mobile core network 130 by using the fixed access device. In this embodiment, the CPE 110 has no built-in USIM but has an authentication function. Further, the authentication function is a NAS access authentication procedure supporting 3GPP. A residential gateway RG (also referred to as a home gateway) is used as an example. Different from the embodiment shown in FIG. 2, in this embodiment, the residential gateway has no built-in USIM. In other words, the residential gateway is not evolved from CPE of an original WTTx user, and may be CPE of a newly added fixed network user or CPE of an existing fixed network user. In this scenario, the residential gateway can still access a mobile core network by using the method for accessing a mobile core network by using a fixed access device provided in this embodiment, to obtain a related service provided by the mobile core network.

To better understand this embodiment and how to implement, in the scenario in which the CPE (for example, the residential gateway) of the fixed network user has no built-in USIM, that the CPE (for example, the residential gateway) accesses the mobile core network, a main function of the USIM is first explained. A USIM mainly stores a user identifier (IMSI) and key information. When a wireless user is registered, an operator writes, into a user data server and the USIM, an IMSI and K that are allocated to the user. USIM information is encrypted and is invisible even to the end user, and therefore has relatively high security.

In contrast, after being initially allocated by the operator, dialing account and password information of a fixed-line user is handed over in plaintext to the end user for takeover, and manually input by the user during dialing. It can be learned that the dialing account and password information of the fixed-line user is in high risk of being leaked. Therefore, in fixed-line access authentication, physical location authentication based on physical location information is added on the basis of conventional user password authentication, and a feature of a fixed line existing in a fixed network is used to prevent account embezzlement and migration. In this embodiment, the CPE (for example, the residential gateway) is a conventional fixed-line CPE and has no built-in USIM. Therefore, when the CPE needs to access the mobile core network, a user identifier (IMSI) and a key may be integrated into the CPE (for example, the residential gateway) through a fixed line. To be specific, after the user identifier (IMSI) and the key are allocated to the fixed network user, the user identifier (IMSI) and the key are transferred to the end user (for example, the user identifier (IMSI) and the key are provided during provisioning of the CPE such as an RG or an ONT) through notification, and are subsequently stored and maintained by the end user. In addition, the CPE needs to provide an input interface for the end user to input the corresponding IMSI and key. A difference between the method for accessing a mobile core network by using a fixed access device provided in this embodiment and the method for accessing a mobile core network by using a fixed access device provided in the embodiment shown in FIG. 2 mainly lies in a difference between manners of obtaining the user identifier (IMSI) by the residential gateway in step S102 and between manners of obtaining the key information by the residential gateway in S106. In the embodiment shown in FIG. 2, the residential gateway reads the user identifier (IMSI) and the key information from the built-in USIM, but in this embodiment, the residential gateway receives the user identifier (IMSI) and the key information that are input by the end user or reads the user identifier (IMSI) and the key information from a storage area that stores the user identifier (IMSI) and the key information that are input by the end user. Except the difference between the manners of obtaining the user identifier (IMSI) and the key information by the residential gateway, for specific steps of the method provided in this embodiment, refer to related description in the embodiment shown in FIG. 2. Details are not described herein again.

A person skilled in the art can clearly understand from the foregoing description that, this embodiment and the embodiment shown in FIG. 2 have no difference in terms of specific method procedure, and a main difference lies in a specific manner of obtaining the user identifier (IMSI) and the key information by the CPE. There is no difference in terms of network registration procedure for the CPE regardless of whether the CPE reads the user identifier (IMSI) and the key information from the USIM, or receives the user identifier (IMSI) and the key information from the end user, or obtains the user identifier (IMSI) and the key information from the storage area that stores the user identifier (IMSI) and the key information. However, in a scenario in which the CPE of the newly added fixed network user or the existing fixed network user is migrated to FTTx in which the mobile core network provides a service, when the method for accessing a mobile core network by using a fixed access device provided in this embodiment is used, the CPE does not need to be replaced for the fixed network user, that is, CPE costs are not increased, and the input interface provided by the CPE to the end user for inputting the user identifier (IMSI) and the key information can be implemented through software upgrade. For an operator, a dedicated mobile core network access gateway and a fixed core network do not need to be newly deployed. This reduces costs for migration from normal fixed access to FTTx and implements fast migration. In addition, the mobile core network provides a service to both fixed access and wireless access, which simplifies a network, and reduces subsequent maintenance costs and complexity of the operator.

Figure 3:
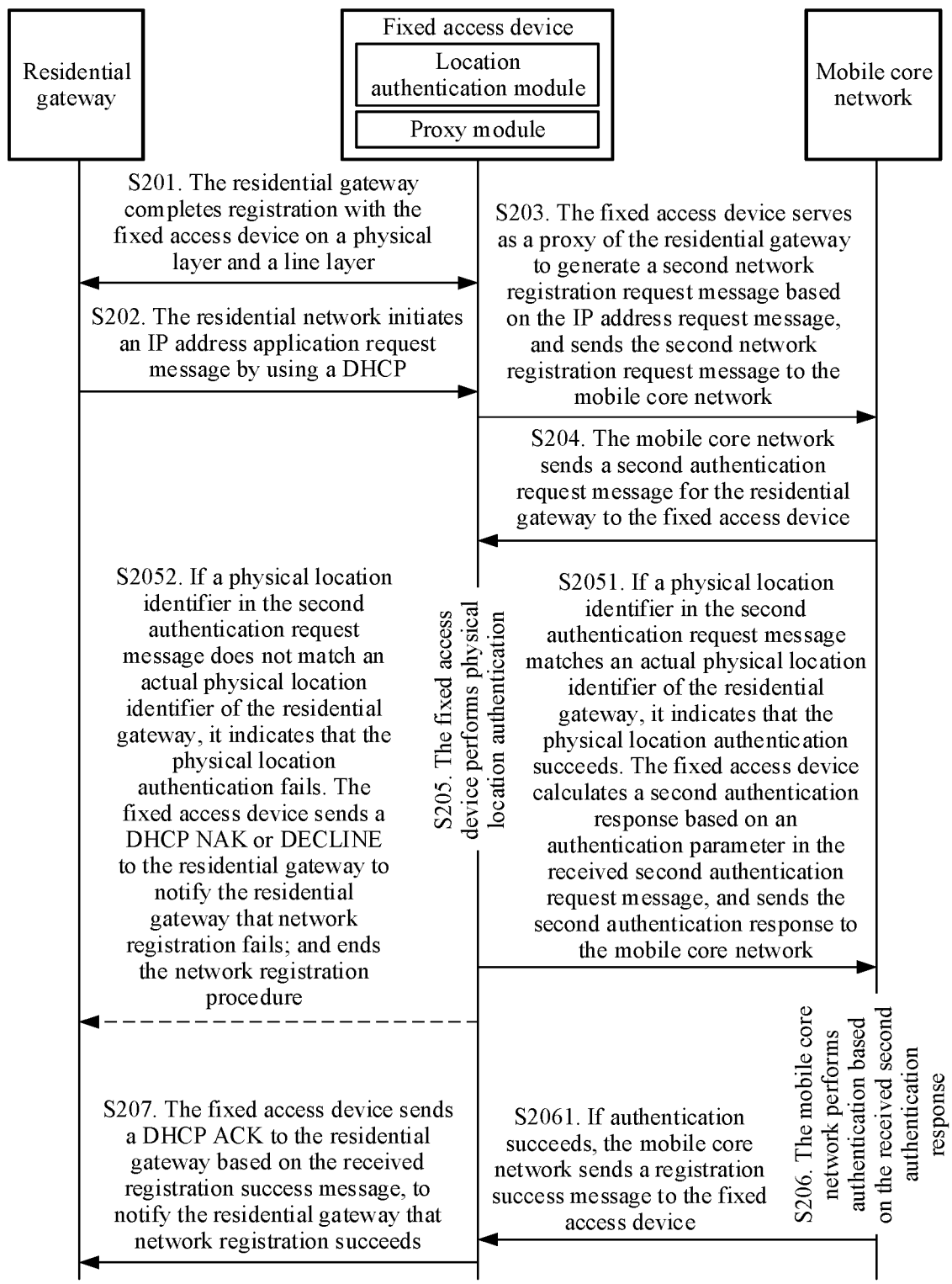
FIG. 3 is a schematic flowchart of another method for accessing a mobile core network by using a fixed access device according to an embodiment of this application.

An embodiment of this application provides another method for accessing a mobile core network by using a fixed access device. As shown in FIG. 3, the method can implement that the CPE 110 in FIG. 1 accesses the deployed mobile core network 130 by using the fixed access device 120. In the embodiment shown in FIG. 3, the CPE 110 has no built-in USIM and has no authentication module with an authentication function. Further, the CPE 110 does not support a NAS access authentication procedure of 3GPP. Therefore, the fixed access device 120 needs to serve as a proxy of the CPE 110, that is, in addition to having a location authentication module, the fixed access device 120 further needs to have a proxy module that implements an authentication function. In the embodiment shown in FIG. 3, that the CPE 110 is a residential gateway RG (referring to FIG. 3) is provided as an example. The method includes the following steps.

S201. The residential gateway completes registration with the fixed access device on a physical layer and a line layer. Further, a specific step of a registration procedure is the same as that of an existing registration procedure of a fixed access network. After registration is completed, the residential gateway and the fixed access device can communicate with each other. It should be noted that the residential gateway is not connected to the mobile core network in this case, and therefore cannot obtain a service (such as a broadband service) of the mobile core network.

S202. The residential gateway initiates an IP address application request message by using a dynamic host configuration protocol (Dynamic Host Configuration Protocol, DHCP).

S203. The fixed access device generates a second network registration request message for the residential gateway based on the IP address application request message by using the proxy module, and sends the second network registration request message to the mobile core network. Specifically, the fixed access device receives the IP address application request message sent by the residential gateway. In response to the IP address application request message, the fixed access device obtains, based on a known hardware identifier of the residential gateway, a user identifier (IMSI) and key information that belong to the residential gateway. The proxy module of the fixed access device generates the second network registration request message that carries the user identifier (IMSI) of the residential gateway. Further, the second network registration request message complies with a NAS signaling protocol of 3GPP. Then the fixed access device encapsulates the second network registration request message into a signaling protocol (such as S1 or N2) required by the mobile core network, to generate a third network-side signaling packet, and sends the third network-side signaling packet to the mobile core network. In specific implementation, the hardware identifier, the user identifier IMSI, and the key information of the residential gateway are configured in the fixed access device by a service provisioning system of an operator during service provisioning, and the fixed access device stores the hardware identifier, the IMSI, and the key information of the residential gateway.

S204. The mobile core network sends a second authentication request message for the residential gateway to the fixed access device. Specifically, the mobile core network receives the third network-side signaling packet sent by the fixed access device, and obtains the second network registration request message from the third network-side signaling packet. Then the mobile core network obtains an authentication parameter from a user data server based on the user identifier (IMSI) that is in the second network registration request message and that belongs to the residential gateway, and generates the second authentication request message that carries the authentication parameter. The second authentication request message further carries a physical location identifier of the residential gateway that needs network registration. Then the mobile core network sends the second authentication request message to the fixed access device. In specific implementation, for a fixed network user (that is, the residential gateway), when the fixed network user is registered, the physical location identifier of CPE (that is, the residential gateway) of the fixed network user is configured in the user data server, to be used for physical location authentication. The authentication request message carries the physical location identifier. Specifically, a TLV (Type-length-value) field may be newly added to the authentication request message to carry the physical location identifier. It should be noted that a message/packet sent by the mobile core network to the fixed access device complies with a signaling protocol (such as S1 or N2) required by the mobile core network.

S205. The fixed access device performs physical location authentication. Specifically, the fixed access device receives the second authentication request message sent by the mobile core network, and then the location authentication module of the fixed access device compares the physical location identifier in the second authentication request message with an actual physical location identifier of the residential gateway.

S2051. If the physical location identifier in the second authentication request message matches the actual physical location identifier of the residential gateway, it indicates that the physical location authentication succeeds. In this case, the fixed access device calculates a second authentication response based on the authentication parameter in the received second authentication request message, and sends the second authentication response to the mobile core network. Specifically, the fixed access device obtains the second authentication response through calculation based on the locally stored key information of the residential gateway and the authentication parameter in the second authentication request message. Then the fixed access device encapsulates the second authentication response into a signaling protocol (such as S1 or N2) required by the mobile core network, to generate a fourth network-side signaling packet; and sends the fourth network-side signaling packet to the mobile core network.

Optionally, in S2052, if the physical location identifier in the second authentication request message does not match the actual physical location identifier of the residential gateway, it indicates that the physical location authentication fails. In this case, the fixed access device sends a DHCP NAK or DECLINE to the residential gateway to notify the residential gateway that network registration fails (that is, IP address application fails); and ends the network registration procedure.

S206. The mobile core network performs authentication based on the received second authentication response. Specifically, the mobile core network receives the fourth network-side signaling packet sent by the fixed access device. The mobile core network compares the second authentication response in the fourth network-side signaling packet with a result obtained by the mobile core network through calculation based on the locally stored key information and the authentication parameter in the second authentication request message.

S2061. If the second authentication response is consistent with the result obtained by the mobile core network through calculation based on the locally stored key information and the authentication parameter in the second authentication request message, it indicates that authentication succeeds, that is, network registration of the residential gateway succeeds. Then the mobile core network allocates a corresponding IP address and service resource to the residential gateway, generates a registration success message that carries a service parameter such as the allocated IP address, and sends the registration success message to the fixed access device.

Optionally, in S2062. If the second authentication response is inconsistent with the result obtained by the mobile core network through calculation based on the locally stored key information and the authentication parameter in the second authentication request message, it indicates that authentication fails. The mobile core network generates a registration failure message, and forwards the registration failure message to the residential gateway by using the fixed access device to notify that network registration fails.

S207. The fixed access device sends a DHCP ACK to the residential gateway based on the received registration success message to notify the residential gateway that network registration succeeds. Specifically, the fixed access device receives the registration success message sent by the mobile core network. The fixed access device parses the registration success message to obtain the service parameters such as the IP address. The fixed access device sends the DHCP ACK to the residential gateway to notify the residential gateway that network registration succeeds (that is, IP address application succeeds). The DHCP ACK includes the IP address. Further, the DHCP ACK includes service parameters allocated by the mobile core network to the residential gateway.

That network registration succeeds means that the residential gateway accesses the mobile core network and can use a service such as a broadband service provided by the mobile core network.

According to the method for accessing a mobile core network by using a fixed access device provided in the embodiment shown in FIG. 3, not only beneficial effects of the method provided in the embodiment shown in FIG. 2 can be achieved (for details, refer to the foregoing related description), but also the CPE can access the mobile core network when the CPE does not support the NAS access procedure of the 3GPP and does not need to be upgraded.

Figure 4:
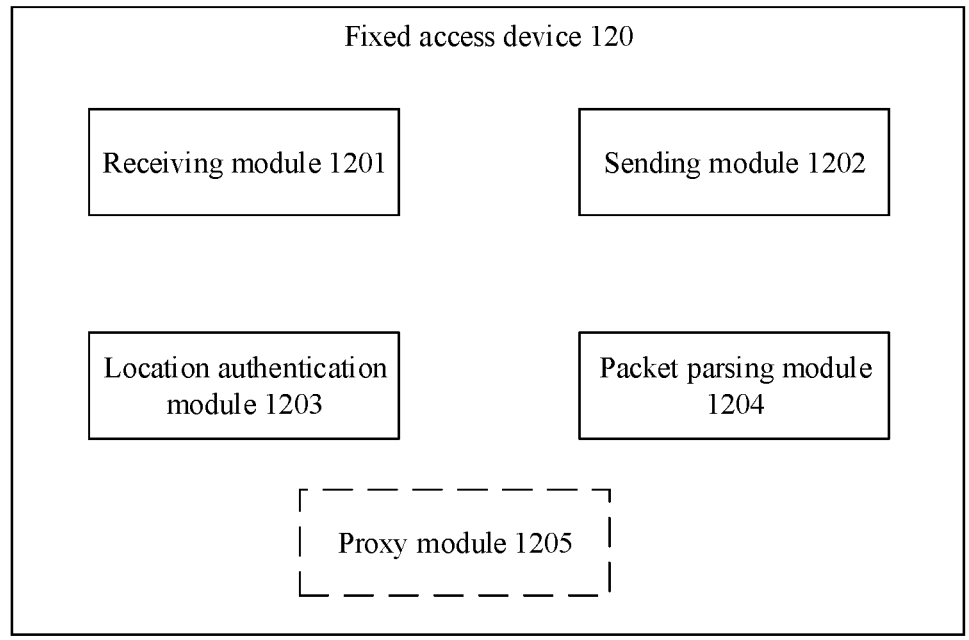
FIG. 4 is a schematic structural diagram of a fixed access device according to an embodiment of this application.

As shown in FIG. 4, an embodiment of this application provides a fixed access device 120. The fixed access device 120 includes a receiving module 1201, a sending module 1202, a location authentication module 1203, and a packet parsing module 1204.

The receiving module 1201 is configured to receive a network registration request sent by customer-premises equipment CPE that completes registration with the fixed access device 120 on a physical layer and a line layer. The sending module 1202 is configured to send a network registration request message for the CPE to a mobile core network, where the network registration request message includes a user identifier of the CPE. The receiving module 1201 is further configured to receive an authentication request message sent by the mobile core network for the CPE, where the authentication request message includes an authentication parameter and a physical location identifier of the CPE that are obtained by the mobile core network from a user data server based on the user identifier of the CPE. The location authentication module 1203 is configured to perform physical location authentication for the CPE based on the physical location identifier in the authentication request message received by the receiving module 1201. Specifically, the location authentication module 1203 is specifically configured to compare the physical location identifier in the authentication request message received by the receiving module 1201 with an actual physical location identifier of the CPE, where that the physical location authentication succeeds means that the physical location identifier in the authentication request message matches the actual physical location identifier of the CPE, and that the physical location authentication fails means that the physical location identifier in the authentication request message does not match the actual physical location identifier of the CPE. Further, if the physical location authentication succeeds, the sending module 1202 is further configured to send an authentication response to the mobile core network, where the authentication response is obtained through calculation based on the authentication parameter in the authentication request message and key information of the CPE. The receiving module 1201 is further configured to receive a registration success message sent by the mobile core network, where the registration success message includes a service parameter that is allocated to the CPE by the mobile core network based on the authentication response after authentication for the CPE succeeds. The sending module 1202 is further configured to: notify the CPE that network registration succeeds, and send the service parameter to the CPE.

Optionally, in a first embodiment of the fixed access device 120 shown in FIG. 4, the receiving module 1201 is specifically configured to receive a first user-side signaling packet sent by the CPE, where the first user-side signaling packet is generated by encapsulating, by the CPE, the network registration request message into a link layer protocol of a fixed access network. Optionally, the network registration request message complies with a NAS signaling protocol of 3GPP.

Further, the fixed access device 120 includes the packet parsing module 1204. The packet parsing module 1204 is configured to parse the first user-side signaling packet received by the receiving module 1201, to obtain the network registration request message. The sending module 1202 is specifically configured to: encapsulate the network registration request message obtained by the packet parsing module 1204 through parsing into a signaling protocol required by the mobile core network, to generate a first network-side signaling packet; and send the first network-side signaling packet to the mobile core network.

Further, the packet parsing module 1204 is configured to parse the authentication request message received by the receiving module 1201, to obtain the authentication parameter. The sending module 1202 is specifically configured to: encapsulate the authentication parameter obtained by the packet parsing module 1204 through parsing into the link layer protocol of the fixed access network, to generate a second user-side signaling packet; and send the second user-side signaling packet to the CPE. The receiving module 1201 is further configured to receive a fourth user-side signaling packet sent by the CPE, where the fourth user-side signaling packet is generated by encapsulating, by the CPE into the link layer protocol of the fixed access network, the authentication response obtained through calculation based on the authentication parameter in the second user-side signaling packet and the key information of the CPE. The packet parsing module 1204 is further configured to parse the fourth user-side signaling packet received by the receiving module 1201, to obtain the authentication response.

Further, the sending module 1202 is specifically configured to: encapsulate the authentication response obtained by the packet parsing module 1204 through parsing into a signaling protocol required by the mobile core network, to generate a second network-side signaling packet; and send the second network-side signaling packet to the mobile core network.

Further, the packet parsing module 1204 parses the registration success message received by the receiving module 1201. The sending module 1202 is specifically configured to: encapsulate the registration success message parsed by the packet parsing module 1204 into the link layer protocol of the fixed access network, to generate a fifth user-side signaling packet; and send the fifth user-side signaling packet to the CPE.

Optionally, if the physical location authentication for the CPE fails, the sending module 1202 is further configured to: generate a registration failure message based on the NAS signaling protocol of the 3GPP; encapsulate the registration failure message into the link layer protocol of the fixed access network to generate a third user-side signaling packet; and send the third user-side signaling packet to the CPE to notify that network registration fails.

In the first embodiment of the fixed access device 120 shown in FIG. 4, in a scenario in which the CPE accesses the mobile core network, the fixed access device provides a location authentication function and a message forwarding function for the CPE. In other words, the fixed access device provided in the first embodiment of the fixed access device 120 shown in FIG. 4 may be applied to the embodiment corresponding to FIG. 2 to implement that the CPE accesses the mobile core network.

Optionally, in a second embodiment of the fixed access device 120 shown in FIG. 4, the receiving module 1201 is specifically configured to receive an IP address application request sent by the CPE by using a dynamic host configuration protocol DHCP.

Further, the fixed access device includes a proxy module 1205. The proxy module 1205 is configured to: obtain, based on the IP address application request received by the receiving module 1201 and a hardware identifier of the CPE, the user identifier belonging to the CPE; and generate the network registration request message that carries the user identifier of the CPE. Optionally, the network registration request message complies with a NAS signaling protocol of 3GPP. The sending module 1202 is specifically configured to: encapsulate, into a signaling protocol required by the mobile core network, the network registration request message generated by the proxy module 1205 to generate a third network-side signaling packet; and send the third network-side signaling packet to the mobile core network.

Further, the packet parsing module 1204 is configured to parse the authentication request message received by the receiving module 1201, to obtain the authentication parameter. The proxy module 1205 is further configured to calculate the authentication response based on the authentication parameter obtained by the packet parsing module 1204 through parsing and the key information of the CPE. The sending module 1202 is specifically configured to: encapsulate the authentication response obtained by the proxy module 1205 into a signaling protocol required by the mobile core network, to generate a fourth network-side signaling packet; and send the fourth network-side signaling packet to the mobile core network.

Further, the sending module 1202 is specifically configured to send a DHCP ACK to the CPE to notify the CPE that network registration succeeds, where the DHCP ACK includes the service parameter allocated to the CPE by the mobile core network.

Optionally, if the physical location authentication for the CPE fails, the sending module 1202 is further configured to send a DHCP NAK or DECLINE to the CPE to notify the CPE that network registration fails.

In the second embodiment of the fixed access device 120 shown in FIG. 4, in a scenario in which the CPE accesses the mobile core network, in addition to providing a location authentication function and a message forwarding function for the CPE, the fixed access device further serves as a proxy of the CPE to initiate a network registration request and perform an authentication response calculation function. In other words, the fixed access device provided in the second embodiment of the fixed access device 120 shown in FIG. 4 may be applied to the embodiment corresponding to FIG. 3 to implement that the CPE accesses the mobile core network.

Figure 5:
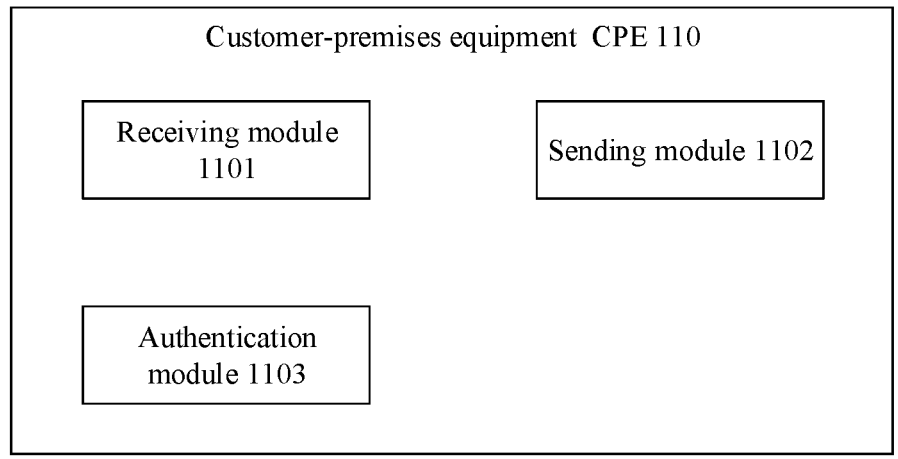
FIG. 5 is a schematic diagram of a structure of a customer-premises equipment according to an embodiment of this application.

As shown in FIG. 5, an embodiment of this application provides customer-premises equipment CPE 110. The CPE 110 may access a mobile core network by using the fixed access device 120 provided in the embodiment corresponding to FIG. 4. The CPE 110 includes a receiving module 1101, a sending module 1102, and an authentication module 1103. The sending module 1102 is configured to: encapsulate a network registration request message into a link layer protocol of a fixed access network to generate a first user-side signaling packet, and send the first user-side signaling packet to the fixed access device, so that the fixed access device forwards the network registration request message to the mobile core network, where the network registration request message includes a user identifier of the CPE. The receiving module 1101 is configured to receive a second user-side signaling packet sent by the fixed access device, where the second user-side signaling packet is generated by encapsulating, by the fixed access device, an authentication parameter into the link layer protocol of the fixed access network, and the authentication parameter is obtained by the mobile core network from a user data server based on the user identifier of the CPE. The authentication module 1103 is configured to obtain an authentication response through calculation based on key information of the CPE and the authentication parameter in the second user-side signaling packet received by the receiving module 1101. The authentication module 1103 supports a NAS authentication procedure of 3GPP. The sending module 1102 is further configured to: encapsulate the authentication response obtained by the authentication module 1103 into the link layer protocol of the fixed access network to generate a fourth user-side signaling packet, and send the fourth user-side signaling packet to the fixed access device, so that the fixed access device forwards the authentication response to the mobile core network. The receiving module 1101 is further configured to receive a fifth user-side signaling packet sent by the fixed access device, where the fifth user-side signaling packet includes a service parameter that is allocated to the CPE by the mobile core network based on the authentication response after authentication for the CPE succeeds.

Figure 6:
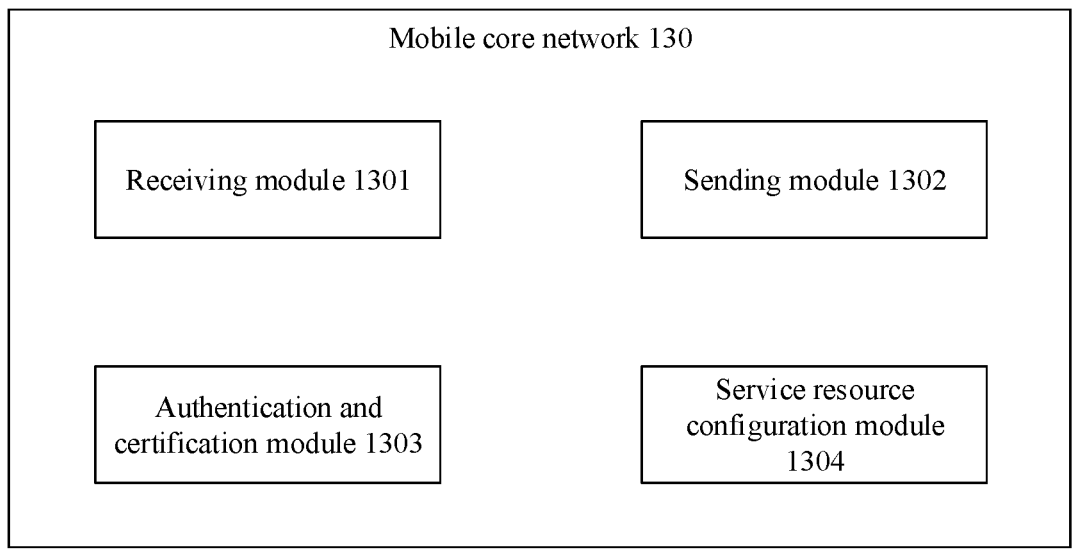
FIG. 6 is a schematic structural diagram of a mobile core network according to an embodiment of this application.

As shown in FIG. 6, an embodiment of this application provides a mobile core network 130. The mobile core network 130 includes a receiving module 1301, a sending module 1302, an authentication and certification module 1303, and a service resource configuration module 1304. The receiving module 1301 is configured to receive a network registration request message sent by a fixed access device, where the network registration request message is used to apply for accessing the mobile core network 130 by customer-premises equipment CPE, the CPE completes registration with the fixed access device on a physical layer and a line layer, and the network registration request message includes a user identifier of the CPE. The authentication and certification module 1303 is configured to: obtain an authentication parameter from a user data server based on the user identifier of the CPE, and generate an authentication request message that carries the authentication parameter and a physical location identifier of the CPE. The sending module 1302 is configured to send the authentication request message to the fixed access device, so that the fixed access device forwards the authentication parameter in the authentication request message to the CPE, where the physical location identifier is used by the fixed access device to perform physical location authentication for the CPE. The receiving module 1301 is further configured to receive an authentication response sent by the fixed access device, where the authentication response is obtained through calculation based on the authentication parameter and key information of the CPE. The authentication and certification module 1303 is further configured to perform authentication for the CPE based on the authentication response. After authentication performed by the authentication and certification module 1303 succeeds, the service resource configuration module 1304 is configured to allocate a service resource to the CPE. Then the sending module 1302 is further configured to: generate a registration success message that carries the service resource, and send the registration success message to the fixed access device, so that the fixed access device forwards the registration success message to the CPE.

The "module" appearing in the foregoing embodiment may be implemented by software, may be implemented by hardware, or may be implemented by a combination of software and hardware. A specific implementation is not limited in this embodiment of this application, for example, the receiving module may be a receiver.

Figure 7:
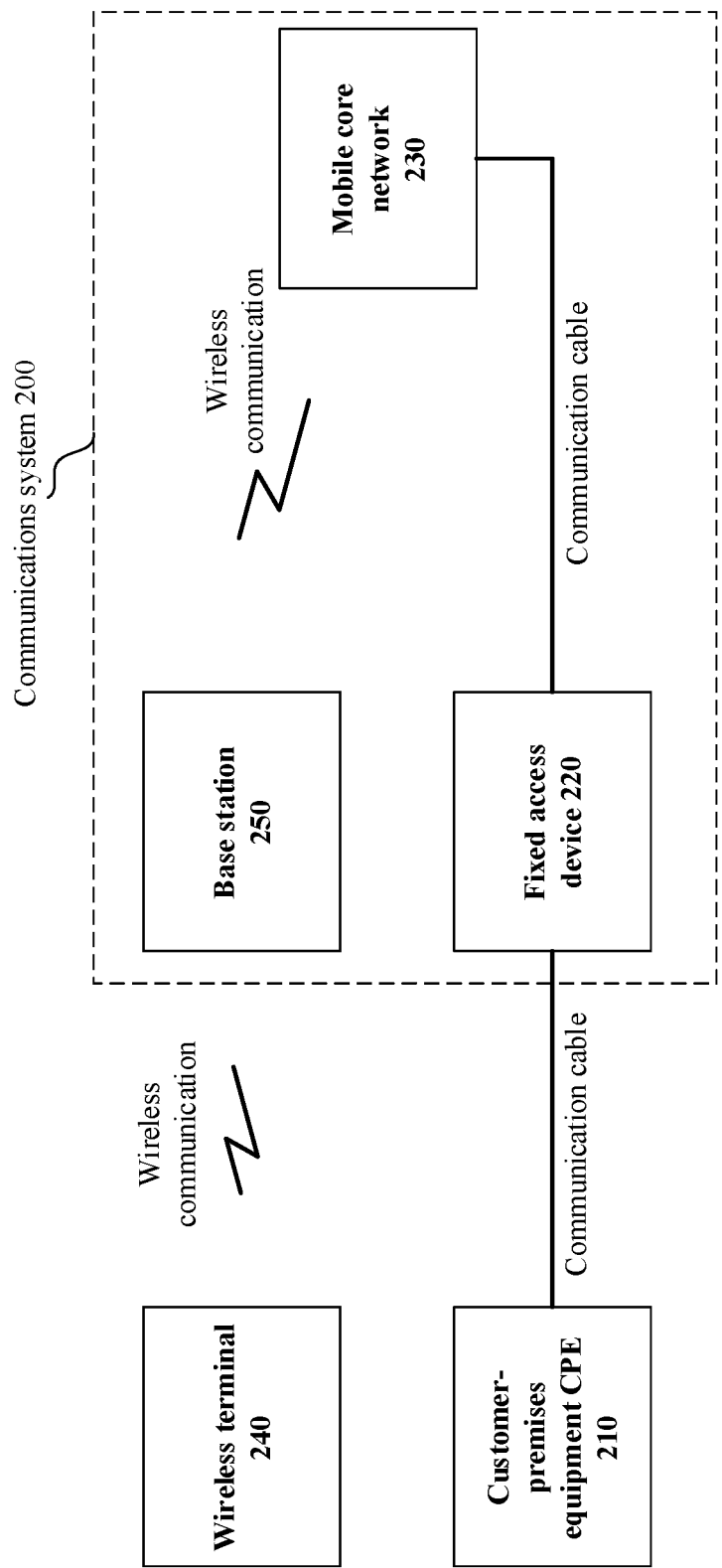
FIG. 7 is a schematic diagram of another communications system according to an embodiment of this application.

As shown in FIG. 7, an embodiment of this application provides a communications system 200. The communications system 200 includes a fixed access device 220, a mobile core network 230, and a base station 250. The fixed access device 220 and the mobile core network 230 communicate with each other through a communications cable, and the base station 250 and the mobile core network 230 communicate with each other by using a wireless communications protocol. The wireless terminal 240 and the base station 250 are connected through wireless communication. The fixed access device 220 encapsulates a message into a signaling protocol required by the mobile core network 230, to generate a network-side signaling packet, and sends the network-side signaling packet to the mobile core network 230.

Further, the fixed access device 220 is connected to customer-premises equipment CPE 210 through a communications cable. The fixed access device 220 parses a link layer protocol of a fixed access network to obtain a message sent from the CPE 210; encapsulates the message into a signaling protocol required by the mobile core network 230, to generate a network-side signaling packet; and sends the network-side signaling packet to the mobile core network 230.

It should be noted that the fixed access device 220 may be the fixed access device 120 provided in the embodiment corresponding to FIG. 4. For details, refer to related description. Details are not described herein again. Similarly, the mobile core network 230 may be the mobile core network 130 provided in the embodiment corresponding to FIG. 6. For details, refer to related description. Details are not described herein again.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for accessing a mobile core network, comprising:
    receiving, by a fixed access device, a network registration request sent by customer-premises equipment (CPE), wherein the CPE registers with the fixed access device on a physical layer and a line layer;
    sending, by the fixed access device, a network registration request message for the CPE to a mobile core network based on the network registration request, wherein the network registration request message comprises a user identifier of the CPE;
    receiving, by the fixed access device, an authentication request message sent by the mobile core network for the CPE, wherein the authentication request message comprises an authentication parameter and a physical location identifier of the CPE that are obtained by the mobile core network from a user data server based on the user identifier of the CPE;

performing, by the fixed access device, physical location authentication for the CPE based on the physical location identifier;

in response to determining that the physical location authentication succeeds, sending, by the fixed access device, an authentication response to the mobile core network, wherein the authentication response is obtained through calculation based on the authentication parameter and key information of the CPE;

receiving, by the fixed access device, a registration success message sent by the mobile core network, wherein the registration success message comprises a service parameter that is allocated to the CPE by the mobile core network based on the authentication response after authentication for the CPE succeeds;

notifying, by the fixed access device based on the registration success message, the CPE that network registration succeeds; and sending the service parameter to the CPE.

2. The method according to claim 1, wherein receiving the network registration request sent by the CPE comprises:

receiving, by the fixed access device, a first user-side signaling packet sent by the CPE, wherein the first user-side signaling packet is generated by encapsulating, by the CPE, the network registration request message into a link layer protocol of a fixed access network, wherein the network registration request message complies with a non-access stratum (NAS) signaling protocol of 3GPP.

3. The method according to claim 2, wherein sending the network registration request message for the CPE to the mobile core network comprises:

parsing, by the fixed access device, the first user-side signaling packet to obtain the network registration request message;

encapsulating, by the fixed access device, the network registration request message into a signaling protocol required by the mobile core network, to generate a first network-side signaling packet; and sending, by the fixed access device, the first network-side signaling packet to the mobile core network.

4. The method according to claim 2, wherein before sending the authentication response to the mobile core network, the method further comprises:

parsing, by the fixed access device, the authentication request message to obtain the authentication parameter;

encapsulating the authentication parameter into the link layer protocol of the fixed access network to generate a second user-side signaling packet;

sending, by the fixed access device, the second user-side signaling packet to the CPE;

receiving, by the fixed access device, a fourth user-side signaling packet sent by the CPE, wherein the fourth user-side signaling packet is generated by encapsulating, by the CPE into the link layer protocol of the fixed access network, the authentication response obtained through calculation based on the authentication parameter in the second user-side signaling packet and the key information of the CPE; and parsing, by the fixed access device, the fourth user-side signaling packet to obtain the authentication response.

5. The method according to claim 4, wherein sending the authentication response to the mobile core network comprises:

encapsulating, by the fixed access device, the authentication response into a signaling protocol required by the mobile core network, to generate a second network-side signaling packet; and sending, by the fixed access device, the second network-side signaling packet to the mobile core network.

6. The method according to claim 2, wherein sending the service parameter to the CPE comprises:

after parsing the registration success message, encapsulating, by the fixed access device, the parsed registration success message into the link layer protocol of the fixed access network to generate a fifth user-side signaling packet; and sending, by the fixed access device, the fifth user-side signaling packet to the CPE.

7. The method according to claim 2, wherein the method further comprises:

in response to determining that the physical location authentication fails, generating, by the fixed access device, a registration failure message based on the NAS signaling protocol of the 3GPP;

encapsulating, by the fixed access device, the registration failure message into the link layer protocol of the fixed access network to generate a third user-side signaling packet; and sending, by the fixed access device, the third user-side signaling packet to the CPE to notify the CPE that the network registration fails.

8. The method according to claim 1, wherein the network registration request is an IP address application request, and receiving the network registration request sent by the CPE comprises:

receiving, by the fixed access device, the IP address application request sent by the CPE by using a dynamic host configuration protocol (DHCP).

9. The method according to claim 8, wherein sending the network registration request message for the CPE to the mobile core network comprises:

in response to the IP address application request, obtaining, by the fixed access device based on a hardware identifier of the CPE, the user identifier belonging to the CPE;

generating, by the fixed access device, the network registration request message that carries the user identifier of the CPE, wherein the network registration request message complies with a NAS signaling protocol of 3GPP;

encapsulating, by the fixed access device, the network registration request message into a signaling protocol of the mobile core network to generate a third network-side signaling packet; and sending, by the fixed access device, the third network-side signaling packet to the mobile core network.

10. The method according to claim 8, wherein before sending the authentication response to the mobile core network, the method further comprises:

parsing, by the fixed access device, the authentication request message to obtain the authentication parameter, and calculating the authentication response based on the authentication parameter and the key information of the CPE, and wherein sending, by the fixed access device, the authentication response to the mobile core network comprises:

encapsulating, by the fixed access device, the authentication response into a signaling protocol of the mobile core network to generate a fourth network-side signaling packet; and sending, by the fixed access device, the fourth network-side signaling packet to the mobile core network.

11. The method according to claim 8, wherein sending the service parameter to the CPE comprises:
sending, by the fixed access device, a DHCP ACK to the CPE, wherein the DHCP ACK comprises the service parameter allocated to the CPE by the mobile core network.

12. The method according to claim 8, wherein the method further comprises:
in response to determining that the physical location authentication fails, sending, by the fixed access device, a DHCP NAK or DECLINE to the CPE to notify the CPE that the network registration fails.

13. An apparatus for accessing a mobile core network, wherein the apparatus comprises:
at least one processor; and
one or more memories coupled to the at least one processor and storing executable program instructions that, when executed by the at least one processor, cause the at least one processor to:
receive a network registration request sent by customer-premises equipment (CPE), wherein the CPE registers with a fixed access device on a physical layer and a line layer;
send a network registration request message for the CPE to a mobile core network based on the network registration request, wherein the network registration request message comprises a user identifier of the CPE;
receive an authentication request message sent by the mobile core network for the CPE, wherein the authentication request message comprises an authentication parameter and a physical location identifier of the CPE that are obtained by the mobile core network from a user data server based on the user identifier of the CPE;
perform physical location authentication for the CPE based on the physical location identifier;
in response to determining that the physical location authentication succeeds, send an authentication response to the mobile core network, wherein the authentication response is obtained through calculation based on the authentication parameter and key information of the CPE;
receive a registration success message sent by the mobile core network, wherein the registration success message comprises a service parameter that is allocated to the CPE by the mobile core network based on the authentication response after authentication for the CPE succeeds;
notify, based on the registration success message, the CPE that network registration succeeds; and
send the service parameter to the CPE.

14. The apparatus according to claim 13, wherein receiving the network registration request sent by the CPE comprises:
receiving a first user-side signaling packet sent by the CPE, wherein the first user-side signaling packet is generated by encapsulating, by the CPE, the network registration request message into a link layer protocol of a fixed access network, wherein the network registration request message complies with a non-access stratum (NAS) signaling protocol of 3GPP.

15. The apparatus according to claim 14, wherein sending the network registration request message for the CPE to the mobile core network comprises:

parsing the first user-side signaling packet to obtain the network registration request message;
encapsulating, by the fixed access device, the network registration request message into a signaling protocol required by the mobile core network, to generate a first network-side signaling packet; and
sending the first network-side signaling packet to the mobile core network.

16. The apparatus according to claim 14, wherein before sending the authentication response to the mobile core network, the executable program instructions further cause the at least one processor to:
parse the authentication request message to obtain the authentication parameter;
encapsulate the authentication parameter into the link layer protocol of the fixed access network to generate a second user-side signaling packet;
send the second user-side signaling packet to the CPE;
receive a fourth user-side signaling packet sent by the CPE, wherein the fourth user-side signaling packet is generated by encapsulating, by the CPE into the link layer protocol of the fixed access network, the authentication response obtained through calculation based on the authentication parameter in the second user-side signaling packet and the key information of the CPE; and
parse the fourth user-side signaling packet to obtain the authentication response.

17. The apparatus according to claim 16, wherein sending the authentication response to the mobile core network comprises:
encapsulating the authentication response into a signaling protocol required by the mobile core network, to generate a second network-side signaling packet; and
sending the second network-side signaling packet to the mobile core network.

18. A non-transitory computer-readable storage medium storing a program, wherein the program comprises instructions, and when the instructions are executed by a computer, cause the computer to perform operations comprising: receiving, by a fixed access device, a network registration request sent by customer-premises equipment (CPE), wherein the CPE registers with the fixed access device on a physical layer and a line layer; sending, by the fixed access device, a network registration request message for the CPE to a mobile core network based on the network registration request, wherein the network registration request message comprises a user identifier of the CPE; receiving, by the fixed access device, an authentication request message sent by the mobile core network for the CPE, wherein the authentication request message comprises an authentication parameter and a physical location identifier of the CPE that are obtained by the mobile core network from a user data server based on the user identifier of the CPE; performing, by the fixed access device, physical location authentication for the CPE based on the physical location identifier; in response to determining that the physical location authentication succeeds, sending, by the fixed access device, an authentication response to the mobile core network, wherein the authentication response is obtained through calculation based on the authentication parameter and key information of the CPE; receiving, by the fixed access device, a registration success message sent by the mobile core network, wherein the registration success message comprises a service parameter that is allocated to the CPE by the mobile core network based on the authentication response after authentication for the CPE succeeds; notifying, by the fixed access device based on the registration success message, the CPE that network registration succeeds; and sending the service parameter to the CPE.

19. The non-transitory computer-readable storage medium according to claim 18, wherein receiving the network registration request sent by the CPE further comprises: receiving a first user-side signaling packet sent by the CPE, wherein the first user-side signaling packet is generated by encapsulating, by the CPE, the network registration request message into a link layer protocol of a fixed access network, wherein the network registration request message complies with a non-access stratum (NAS) signaling protocol of 3GPP.

20. The non-transitory computer-readable storage medium according to claim 19, wherein sending the network registration request message further comprises: parsing the first user-side signaling packet to obtain the network registration request message; encapsulating, by the fixed access device, the network registration request message into a signaling protocol required by the mobile core network, to generate a first network-side signaling packet; and sending the first network-side signaling packet to the mobile core network.

21. A method for accessing a mobile core network, comprising:
    generating, by customer-premises equipment (CPE), a network registration request message, wherein the network registration request message is used to apply for accessing a mobile core network by the CPE, and the network registration request message comprises a user identifier of the CPE;
    encapsulating, by the CPE, the network registration request message into a link layer protocol of a fixed access network to generate a first user-side signaling packet;
    sending, by the CPE, the first user-side signaling packet to a fixed access device, wherein the fixed access device forwards the network registration request message to the mobile core network, wherein the CPE registers with the fixed access device on a physical layer and a line layer;
    receiving, by the CPE, a second user-side signaling packet sent by the fixed access device, wherein the second user-side signaling packet is generated by encapsulating, by the fixed access device, an authentication parameter into the link layer protocol of the fixed access network, and the authentication parameter is obtained by the mobile core network from a user data server based on the user identifier of the CPE;
    obtaining, through calculation by the CPE, an authentication response based on the authentication parameter in the second user-side signaling packet and key information of the CPE;
    encapsulating, by the CPE, the authentication response into the link layer protocol of the fixed access network to generate a fourth user-side signaling packet;
    sending, by the CPE, the fourth user-side signaling packet to the fixed access device, wherein the fixed access device forwards the authentication response to the mobile core network; and
    receiving, by the CPE, a fifth user-side signaling packet sent by the fixed access device, wherein the fifth user-side signaling packet comprises a service parameter that is allocated to the CPE by the mobile core network based on the authentication response after authentication for the CPE succeeds.

\* \* \* \* \*